US010364887B2

(12) United States Patent
Van Rooij et al.

(10) Patent No.: US 10,364,887 B2
(45) Date of Patent: Jul. 30, 2019

(54) CONTROL SYSTEM FOR A CONTINUOUSLY VARIABLE TRANSMISSION

(71) Applicant: Punch Powertrain NV, Sint-Truden (BE)

(72) Inventors: Jacobus Hubertus Maria Van Rooij, Nuenen (NL); Johan Francis Anne Jesse Thoolen, Haelen (NL)

(73) Assignee: Punch Powertrain NV, Sint-Truiden (BE)

( * ) Notice: Subject to any disclaimer, the term of this patent is extended or adjusted under 35 U.S.C. 154(b) by 12 days.

(21) Appl. No.: 15/568,434

(22) PCT Filed: Apr. 20, 2016

(86) PCT No.: PCT/NL2016/000009
§ 371 (c)(1),
(2) Date: Oct. 20, 2017

(87) PCT Pub. No.: WO2016/171545
PCT Pub. Date: Oct. 27, 2016

(65) Prior Publication Data
US 2018/0080551 A1 Mar. 22, 2018

(30) Foreign Application Priority Data

Apr. 21, 2015 (NL) ...................................... 1041280

(51) Int. Cl.
*F16H 61/30* (2006.01)
*F16H 61/662* (2006.01)
(Continued)

(52) U.S. Cl.
CPC ............ *F16H 61/662* (2013.01); *F15B 11/17* (2013.01); *F15B 13/024* (2013.01);
(Continued)

(58) Field of Classification Search
CPC ........... Y10T 477/624; Y10T 477/6242; Y10T 477/62427; Y10T 477/62429;
(Continued)

(56) References Cited

U.S. PATENT DOCUMENTS 6,219,608 B1 * 4/2001 Abo .................. F16H 61/66259
474/28
6,243,638 B1 6/2001 Abo et al.
(Continued)

OTHER PUBLICATIONS

International Search Report and Written Opinion of the International Searching Authority for International Patent Application No. PCT/NL2016/000009 dated Dec. 19, 2016.
(Continued)

*Primary Examiner* — Roger L Pang
(74) *Attorney, Agent, or Firm* — Troutman Sanders LLP; Ryan Schneider

(57) ABSTRACT

Control system for a Continuously Variable Transmission with two pairs of conical sheaves each with an adjustable running radius, the sheave of each pair being coupled to a hydraulic actuator and the inlet port of each actuator being connected with the hydraulic actuator setting means, fed from the outlet port of a hydraulic displacement pump, connected to a supply of hydraulic medium and coupled to an electric motor which is controlled by a controller which controls the speed of the electric motor with a first control signal which is generated as a function of the actual transmission ratio of the transmission on one hand and of the desired speed of change of this transmission ratio on the other hand, all this in such a way that the speed of this first motor increases with an increase of the transmission ratio of the transmission on one hand and an increase of the speed of change of the ratio on the other hand, while the outlet port of the displacement pump is connected to the inlet of an electronically controllable pressure relief valve of which the
(Continued)

set point is determined by a second control signal as a function of the set transmission ratio on one hand and the value of the actual torque transmitted through the transmission on the other hand, in such a way that de value of the resulting hydraulic pressure increases as the transmission ratio increases on one hand, and as the torque transmitted through the transmission increases on the other hand.

11 Claims, 1 Drawing Sheet

(51) Int. Cl.
| | |
|---|---|
| F15B 11/17 | (2006.01) |
| F15B 13/02 | (2006.01) |
| F16H 61/00 | (2006.01) |
| F16H 59/14 | (2006.01) |
| F16H 59/70 | (2006.01) |

(52) U.S. Cl.
CPC ......... *F16H 61/0031* (2013.01); *F16H 61/30* (2013.01); *F16H 61/66254* (2013.01); *F16H 61/66272* (2013.01); *F15B 2211/20576* (2013.01); *F15B 2211/2658* (2013.01); *F15B 2211/275* (2013.01); *F15B 2211/7052* (2013.01); *F15B 2211/71* (2013.01); *F16H 59/14* (2013.01); *F16H 59/70* (2013.01); *F16H 2059/147* (2013.01); *F16H 2059/704* (2013.01); *F16H 2061/66286* (2013.01); *Y10T 477/624* (2015.01); *Y10T 477/6242* (2015.01); *Y10T 477/62427* (2015.01); *Y10T 477/62429* (2015.01)

(58) Field of Classification Search
CPC .... F16H 61/662; F16H 61/0031; F16H 61/30; F16H 61/66254; F16H 61/66272; F16H 2059/704; F16H 59/70; F16H 59/14; F16H 2061/66286; F16B 11/17; F16B 13/02; F16B 2211/71; F16B 2211/20576; F16B 2211/2658; F16B 2211/275; F16B 2211/7052

See application file for complete search history.

(56) References Cited

U.S. PATENT DOCUMENTS

| | | | |
|---|---|---|---|
| 6,739,994 | B1 | 5/2004 | Van Rooij et al. |
| 8,226,507 | B2* | 7/2012 | Uchiyama ............... F16H 61/12 474/49 |
| 9,062,742 | B2* | 6/2015 | Suzuki ................... F16H 61/02 |
| 2004/0254047 | A1 | 12/2004 | Frank et al. |
| 2011/0301793 | A1* | 12/2011 | Hsieh .................. F16H 61/0025 701/22 |

OTHER PUBLICATIONS

NL Search Report of the Netherlands Patent Office for NL 1041290, dated Jan. 11, 2016.

* cited by examiner

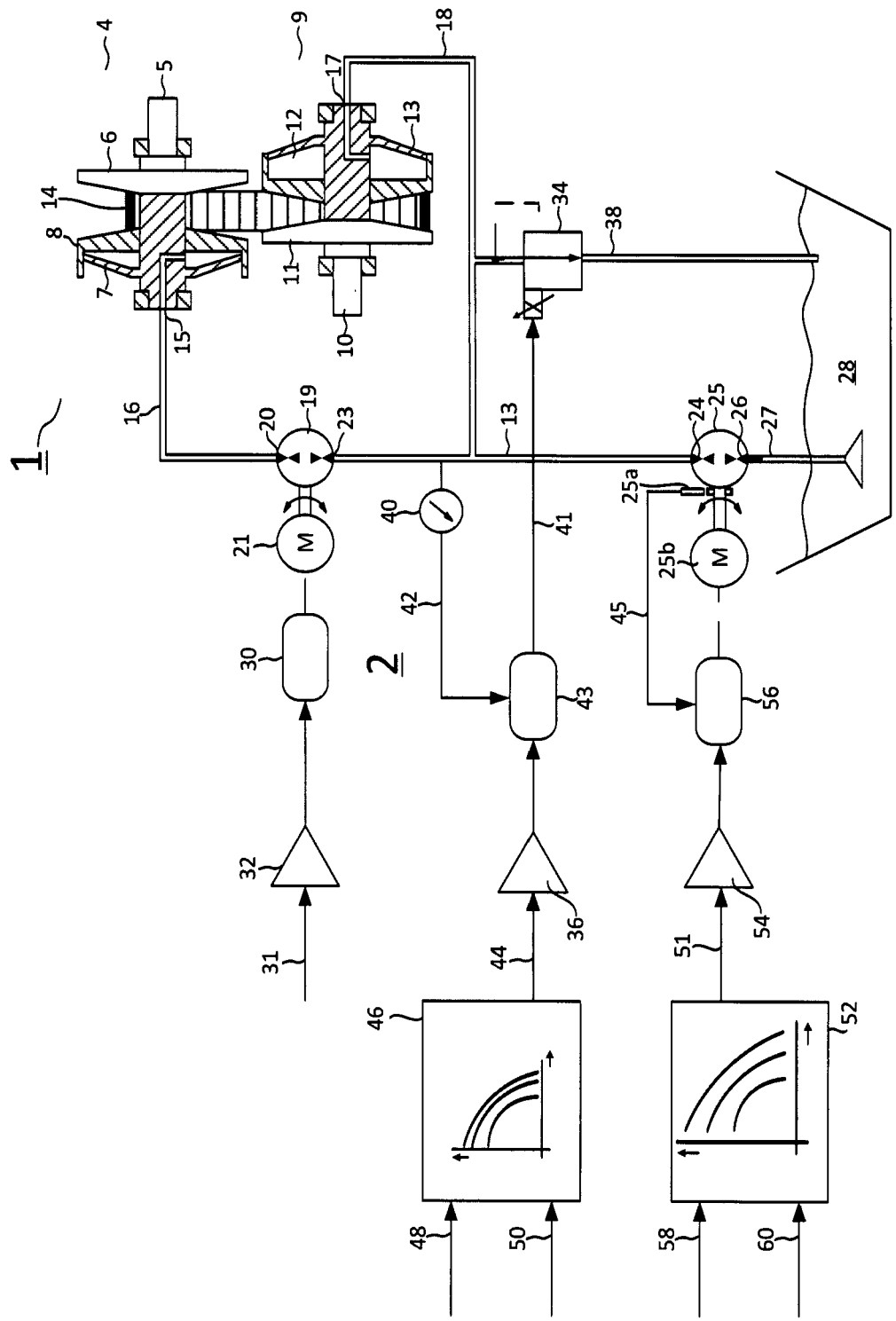

CONTROL SYSTEM FOR A CONTINUOUSLY VARIABLE TRANSMISSION

CROSS-REFERENCE TO RELATED APPLICATIONS

This application is a US National Stage filed under 35 USC § 371 of International Application No. PCT/NL2016/000009, filed 20 Apr. 2016, which claims the benefit of NL 1041280, filed 21 Apr. 2015, each of which are incorporated by reference herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF THE MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The invention relates to a control system.

Description of Related Art Including Information Disclosed Under 37 CFR § 1.97 and 1.98

U.S. Pat. No. 6,243,638 discloses an electronic transmission control system for an automotive vehicle with a belt-type continuously variable automatic transmission employing a primary pulley with a primary pulley actuation chamber, a secondary pulley with a secondary pulley actuation chamber, and a drive belt running in the primary and secondary pulleys whose effective diameters are continuously variable to provide varying pulley ratios. The control of the system's displacement pump may, under certain operating conditions, be accompanied by disturbing phenomena. When the transmission is in a status in which the transmission ratio remains practically unchanged, said pump needs to compensate only low internal leakage losses and therefore, provide substantially no yield, so that this pump and this driving electric motor will stop at regular intervals. The achievement of a sensitive control around this zero point is, however, counteracted by the occurrence of the well-known "stick-slip" effect which is caused by the fact that, in a construction with two moving parts being in contact with each other and movable with respect to one another, the dynamic friction coefficient between these parts is always lower than the static friction coefficient.

BRIEF SUMMARY OF THE INVENTION

The invention aims to obviate these draw backs. According to the invention, this is achieved by the measures as described in the characterising clause of the main claim.

With these measures it is achieved that the second pump always, so also in a quasi-stationary state of the transmission, must have a certain minimum shaft speed, causing the "stick-slip" effect to no longer occur. Since the overflow valve involved in controlling the system pressure can react very quickly, this system will show a very fast response.

Preferably, the measures according to the invention are applied in combination with the hydraulic actuator setting means comprising a second, hydraulic in four quadrant controllable displacement pump with two ports, each one thereof connected to a respective inlet port of one of the sheave actuators, said pump being connected to a second electric motor which is controlled by a second electronic, four quadrant controller while furthermore the inlet port of one of the sheave actuators is connected to the outlet port of the first displacement pump.

It is observed that US2004/0254047 describes a control system for a continuously variable transmission in which the outlet port of the medium supply pump is connected to a spring loaded pressure relief valve. The inventive step cannot be derived from this publication.

BRIEF DESCRIPTION OF THE VIEW OF THE DRAWING

In addition, reference is made to EP 1 105 664 and the therewith corresponding U.S. Pat. No. 6,739,994, both in the name of the Applicant.

The invention is elucidated in more detail by means of the drawing. Therein:

FIG. 1 schematically shows an embodiment of a CVT co-operating with a control system according to the invention.

DETAILED DESCRIPTION OF THE INVENTION

FIG. 1 shows a combination of a continuously variable transmission 1, and an associated control system 2. The continuously variable transmission 1 comprises, in generally known manner, a first conical disc pair 4, composed of a conical disc 6 which is connected rigidly to a shaft 5 (which may be the input shaft of this transmission), and a conical disc 8, movable in the axial direction, with respect to shaft 5, by exerting pressure in a first chamber 7. The conical disc 8, together with the chamber 7, forms the first actuator of the CVT 1. This actuator is connected to the hydraulic conduit 16 leading to the control system 2 via the connection port 15.

Furthermore, the CVT 1 is provided with a second conical disc pair 9, which is mounted on a second shaft 10 (which may be the output shaft of the transmission) and is composed of a conical disc 11, which is connected rigidly to shaft 10 and a conical disc 13, movable in the axial direction, with respect to shaft 10, by exerting pressure in a second chamber 12. The conical disc 13, together with the chamber 12, forms the second actuator of the CVT 1. This actuator is connected to the hydraulic conduit 18 leading to the control system 2 via the connection port 17.

The chambers 7 and 12 are filled with a suitable hydraulic medium, for instance oil. Between the conical discs 6, 8 and 11, 13, an endless transmission means with trapezoidal cross-section 14 has been incorporated. This transmission means can be a flexible strap, belt or chain.

Influencing the tension in the transmission means 14 and the transmission ratio of the CVT determined by the running radii of the transmission means 14 on the conical disc pairs, takes place by means of the control system, by applying pressure in the chambers 7 and 12, and by controlling oil flow to and from these chambers. During the change of the transmission ratio in the one direction, both conical discs 8 and 13 move to the right, increasing the volume of chamber 7 and decreasing the volume of chamber 12, and upon a change of the transmission ratio in the opposite direction, both conical discs 8 and 13 move to the left, decreasing the volume of chamber 7 and increasing the volume of chamber 12. The control system 2 controls the CVT through the two hydraulic conduits 16 and 18 leading to the chambers 7 and 12.

The control system 2, as shown in drawing 1, comprises the hydraulic pump 19, inserted between both chambers 7 and 12 through the conduits 16 and 18 with connection ports 20 and 23. The pump 19 is driven in two directions by the motor 21, which, in generally known manner, is controlled from a motor controller 30, on the basis of the speed signal presented to the convertor 32 via the connection 31. This pump-motor combination provides the ability to displace medium from chamber 7 to chamber 12 and vice versa. In this respect, the volume of the quantity of hydraulic medium in the chambers will change and the conical discs 8 and 13, connected to the chambers, will move in axial direction, causing the position of the transmission means with respect to the conical disc pairs 4 and 9 to change. In this way, the transmission ratio, defined as the ratio between the running radii taken by the transmission means on both conical disc pairs, is continuously varied. All of this is state of the art.

In the control system as shown, the output port 24 of a second hydraulic pump 25 is connected to the hydraulic conduit 18 via the hydraulic conduit 13, and thus connected to the port 17, and the other connection port 26 of the pump 25 is connected to the reservoir 28 containing the hydraulic medium via the hydraulic conduit 27. Under circumstances in which medium has to flow back to the reservoir 28, the pump-motor combination functions as a hydro motor and does not interfere with the altering of the transmission ratio. When the amount of medium which leaves one of the chambers 7 or 12 is smaller than the amount of medium that is taken up by the other chamber, the pump-motor combination functions as a pump and replenishes the shortage. In that case, medium flows from the conduit 27 from the storage space 28 to the conduit 18. The pressure at the connection port 24 of the pump-motor combination 25 is always higher than the pressure at the connection port 26, while the medium can flow in two directions (from the port 26 to the port 24 or vice versa). The pump-motor combination 25 is of a type which is controllable in two quadrants and preferably has a controllable yield. In case of a thus embodied pump-motor combination, it is possible to control the pressure at the output port 24 and to adapt it to the minimal required value, depending on the actual present torque load and transmission ratio of the CVT. During stationary conditions, that is to say, at a constant transmission ratio, as a consequence, the advantage arises that the flow can be reduced as far as is necessary, to the required volume to compensate for possible small leakage losses occurring in the CVT 1 and in control system 2. Under these conditions, in which the pump-motor combination 25 acts as a hydro motor, this may provide energy. The control system 2 in principle offers the possibility to recover this energy, thus even further increasing the energetic efficiency of the CVT as a whole.

So far, the described control system is in accordance with what is known from the state of the art.

As described in the above, there may be operating conditions wherein said second pump 25 is required to deliver only a very small flow rate that may be positive—from port 26 to port 24—or may be negative—from port 24 to port 26. In both of these cases, the "zero point", so the situation wherein the pump is not required to deliver any flow rate at all, will be passed by. It is under those conditions that the "stick-slip"-effect may disturb an exact specific operation of the pump. This results in that, in particular around this zero point, the motor-pump combination is standing still for a short period and consequently "shoots through" to an operation in which the yield is larger or smaller than is required according to the control. Thus, around the zero point, there is a "grey" area as it were, wherein the relation between the driving torque exerted on the pump and the pressure delivered by the pump is not unequivocally determined.

The invention overcomes this problem through the following measures:

there is a proportionally controlled pressure relief valve 34 determining the pressure in the conduit 18, and thus in the chamber 12, by means of an electric control signal coming from the control unit 43, provided to this valve through the connection 41. This valve 34 is incorporated in a hydraulic conduit 38, located between the conduit 18, in which the system pressure provided by the pump 25 prevails, and the storage space 28 and which thus in fact is parallel to the pump 25. The accuracy of the control of the system pressure may (optionally) be further increased by providing the control unit 43 with a feedback signal originating from a pressure converter 40 via the connection 42. In addition, the converter 36 receives a control signal via the connection 44, which is elaborated by the control unit 46, receiving two control signals, namely:

at the input 48 a signal which is representative of the transmission ratio of the CVT pulley discs required at any given time, and at the input 50 a signal which is representative of the actual present torque load on the input shaft of the CVT 1 (here the shaft 5).

To ensure proper operation of the overflow valve 34, on the one hand it is necessary that a minimum amount of hydraulic fluid flows through this valve at all times, but on the other hand, this volume flow must not be too large, in order to keep the amount of energy dissipated via this valve as small as possible. To this end, the speed of the electric motor 25*b*, which drives the pump 25 can be controlled in magnitude and direction by means of the control unit 56, even during dynamic operation of the CVT with rapid gear changes. The accuracy with which this speed is controlled may (optionally) be further increased by feeding a feedback signal coming from a simple encoder 25*a* to the control unit 56 via the connection 45.

With the aid of the control unit 52, and a converter unit 54, the motor controller 56 for the electric motor 25*b* driving the pump 25, is controlled in speed and rotation direction via the connection 51. This is done based on two control parameters, namely:

at the input 58 of the control unit 52 in the form of a signal representing the transmission ratio of the CVT present at a given moment and at the input 60 in the form of a signal representing the desired rate of change of the transmission ratio of the CVT.

The operation of the control unit 52 which controls the speed of the motor 25b, is such that the speed of this motor 25b is increased with an increase of the transmission ratio of the transmission and also with an increase of the rate of change of the transmission ratio.

The size of the torque introduced into the transmission can be determined by means of a torque sensor included in the drive shaft or can be derived from the engine parameters present in the electronic control unit of this engine.

With regard to the determination of the actual transmission ratio of the transmission, there are two possibilities:

determining the transmission ratio from the axial position of one of the pulley discs 8 or 13 by means of a displacement transducer, or determining the revolving speed of the shaft 5 by means of a speed sensor and determining the revolving speed of the shaft 10 with a corresponding speed sensor and determining the transmission ratio from the ratio of these two variables. These two measures are state of the art.

The determination of the rate of change of the actual transmission ratio can be calculated by simply differentiating the thus determined variables.

The determination of the actual speeds of the respective motors 21 and 25b, can be effected in a simple manner by means of commonly known sensors, not shown in the FIGURE.

The electronic processing of the various obtained signals and therefrom deriving of the necessary control variables with the aid of which the control according to the invention is realized, will cause no problems for the average person skilled in the art.

According to the invention, the flow to be delivered by the pump 25 at any given moment, will thus be chosen slightly larger than would be strictly required under the conditions prevailing at that time. The surplus will be released through the electronically controlled overflow valve 34. Therefore, it will no longer occur that the pump 25 is operated around the point of standstill, as a result of which the problems caused by the stick-slip effect will no longer exist. Furthermore, it is an advantage that an electronically controlled pressure relief valve has a very fast response time, which in particular is much faster than the response speed of the torque controlled pump-motor combination according to the prior art, the response time being dependent on the rotational mass inertia of the rotors of electric motor and pump. The invention thus contributes to an improved controllability of the CVT, in particular under dynamic conditions during rapid gear changes.

The invention claimed is:

1. A control system for a Continuously Variable Transmission (CVT) which comprises two pairs of conical sheaves each with an adjustable running radius and intercoupled by an endless transmission means in which of each pair at least one sheave is coupled to a hydraulic actuator which sets the axial position of this sheave in that its inlet port is connected to hydraulic actuator setting means to supply to, receptively discharge from said actuator hydraulic pressure medium which is delivered to these sheave actuators from an outlet port of a first, in two quadrants controllable, hydraulic displacement pump of which an inlet port is connected to a supply of hydraulic medium, said first pump being coupled to a first electric motor which is controlled by a first, in two quadrants operative, controller which controls a speed of said first electric motor with a first control signal which is generated as a function of an actual transmission ratio of the transmission on one hand and of a desired speed of change of the transmission ratio on the other hand, all this in such a way that the speed of this first motor increases with an increase of the transmission ratio of the transmission on one hand and an increase of the speed of change of the ratio on the other hand;

wherein the outlet port of the first displacement pump is connected to the inlet of an electronically controllable pressure relief valve of which a set point is determined by a second control signal as a function of the actual set transmission ratio on one hand and a value of an actual torque transmitted through the transmission on the other hand, in such a way that the value of a resulting hydraulic pressure increases as the transmission ratio increases on one hand, and as the torque transmitted through the transmission increases on the other hand.

2. The control system according to claim 1;

wherein the hydraulic actuator setting means comprise a second, hydraulic in four quadrant controllable displacement pump with two ports, each one thereof connected to a respective inlet port of one of the sheave actuators, said pump being connected to a second electric motor which is controlled by a second electronic, four quadrant controller while furthermore the inlet port of one of the sheave actuators is connected to the outlet port of the first displacement pump.

3. A control system for a continuously variable transmission, the continuously variable transmission having a transmission ratio and a torque transmitted through the transmission, the continuously variable transmission including a pump providing system hydraulic pressure, the control system comprising:

a control unit; and an electronically controllable pressure relief valve in hydraulic communication with the pump;

wherein the electronically controllable pressure relief valve is responsive to an electric control signal from the control unit;

wherein the electronically controllable pressure relief valve has a set point related to a set transmission ratio and a set value of the torque transmitted through the transmission; and wherein the value of the system hydraulic pressure increases as the transmission ratio increases and as the torque transmitted through the transmission increases.

4. The control system of claim 3, wherein an outlet port of the pump is connected to an inlet of the electronically controllable pressure relief valve of which the set point is determined by the electric control signal as a function of the set transmission ratio on one hand and the value of the torque transmitted through the transmission on the other hand, in such a way that the value of the system hydraulic pressure increases as the transmission ratio increases on one hand, and as the torque transmitted through the transmission increases on the other hand.

5. A control system for a continuously variable transmission, the continuously variable transmission comprising a first transmission portion, a second transmission portion, a hydraulic actuator setting device, an endless transmission assembly, and a first pump, the first transmission portion including a first shaft, a first pair of first and second conical sheaves with an adjustable running radius and mounted on the first shaft, the first conical sheave rigidly connected to the first shaft, the second conical sheave movable in the axial direction with respect to the first shaft, and a first chamber, where the second conical sheave and the chamber form a first actuator, the second transmission portion including a second shaft, a second pair of first and second conical sheaves with an adjustable running radius and mounted on the second shaft, the first conical sheave rigidly connected to the second shaft, the second conical sheave movable in the axial direction with respect to the second shaft, and a second chamber, where the second conical sheave and the chamber forming a second actuator, the hydraulic actuator setting device adapted to supply hydraulic pressure medium to the first and second actuators, and to discharge hydraulic pressure medium from the first and second actuators, the endless transmission assembly intercoupling the first and second pairs of conical sheaves, the endless transmission assembly having a tension, the first pump in hydraulic connection to a supply of hydraulic pressure medium and the hydraulic actuator setting, the first pump in electrical connection with a first motor controlled by a first controller, the first controller controlling the speed of the first motor with a first control signal that is generated as a function of an actual transmission ratio of the transmission on one hand, and of a desired speed of change of the transmission ratio on the other hand, all this in such a way that the speed of the first motor increases with an increase of the transmission ratio of the transmission on one hand and an increase of the speed of change of the ratio on the other hand, the control system comprising:
  an electronically controllable pressure relief valve in hydraulic connection with the first pump, a set point of the electronically controllable pressure relief valve determined by a second control signal as a function of an actual set transmission ratio on one hand and the value of an actual torque transmitted through the transmission on the other hand, in such a way that the value of the resulting hydraulic pressure increases as the transmission ratio increases on one hand, and as the torque transmitted through the transmission increases on the other hand.

6. The control system of claim 5 further comprising:
a first control unit; and
a first converter unit;
  wherein the first controller for the first motor driving the first pump is controlled in speed and rotation direction by the first control unit and the first converter unit.

7. The control system of claim 6, wherein the first control unit has two input signals, a first input signal representative of the transmission ratio of the continuously variable transmission present at a given moment, and a second input signal representative of a desired rate of change of the transmission ratio of the continuously variable transmission.

8. The control system of claim 7, wherein the operation of the first control unit that which controls the speed of the first motor is such that the speed of the first motor is increased with an increase of the transmission ratio of the transmission and also with an increase of the rate of change of the transmission ratio.

9. The control system of claim 5 further comprising:
a second controller; and
a pressure converter;
  wherein the second controller generates the second control signal; and
  wherein the pressure converter provides a feedback signal to the second controller.

10. The control system of claim 5 further comprising:
a second controller;
a second control unit; and
a second converter unit;
  wherein the second controller for the electronically controllable pressure relief valve is controlled by the second control unit and the second converter unit.

11. The control system of claim 10, wherein the second control unit has two input signals, a first input signal representative of the transmission ratio of the continuously variable transmission second conical sheaves at any given time, and a second input signal representative of the actual present torque load on the first shaft.

* * * * *